J. E. GALTRA.
STARTER FOR EXPLOSIVE ENGINES.
APPLICATION FILED MAR. 4, 1912.
1,045,966.
Patented Dec. 3, 1912.
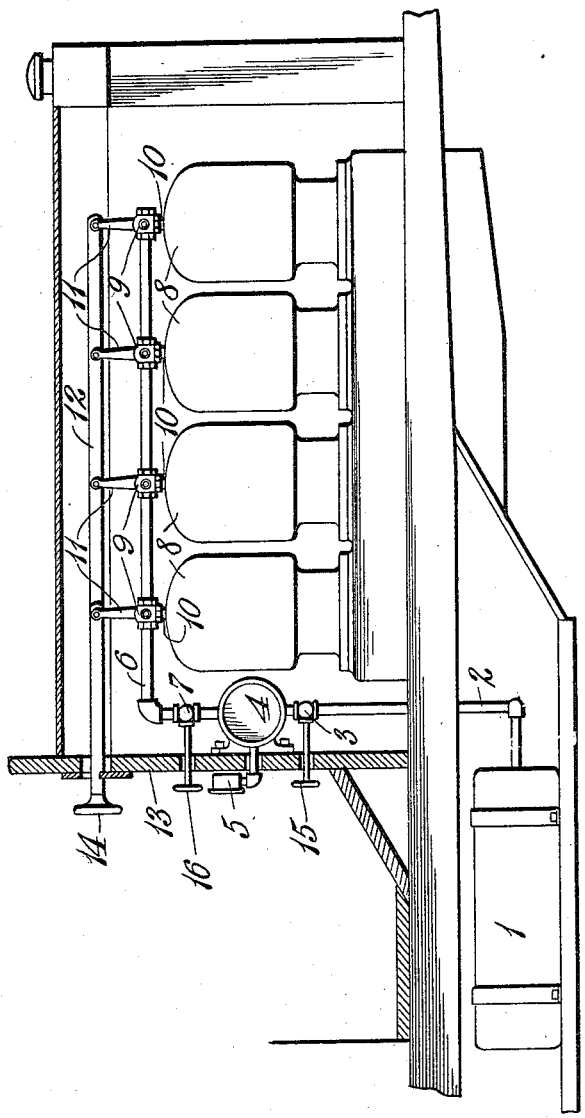
Witnesses
Chas. W. Stauffiger
Anna M. Dorr
Inventor
Judson E. Galtra,
By
Attorneys

UNITED STATES PATENT OFFICE.

JUDSON E. GALTRA, OF ADRIAN, MINNESOTA.

STARTER FOR EXPLOSIVE-ENGINES.

1,045,966.

Specification of Letters Patent.

Patented Dec. 3, 1912.

Application filed March 4, 1912. Serial No. 681,479.

*To all whom it may concern:*

Be it known that I, JUDSON E. GALTRA, a citizen of the United States of America, residing at Adrian, in the county of Nobles and State of Minnesota, have invented certain new and useful Improvements in Starters for Explosive-Engines, of which the following is a specification, reference being had therein to the accompanying drawings.

This invention relates to a starting device for explosive engines and to an arrangement thereof whereby a definite supply of starting fuel may be given to the motor proportionate to its size.

The invention consists in the matters hereinafter set forth and more particularly pointed out in the appended claims.

In the drawings, Figure 1 is a view largely diagrammatic and in elevation of a device embodying features of the invention, and Fig. 2 is a plan view showing the motor connections.

The device is herein shown as applied to an automobile, although obviously it may be adapted for a motor in any service.

A main tank 1 herein shown is mounted on the running board of an automobile and is connected by a pipe 2 through a controlling valve 3 with an auxiliary tank 4 of known capacity which is provided with a gage 5 of standard type. A distributing pipe 6 leads from the tank through a suitable cut off valve 7 over the cylinder heads 8 of the motor to which the device is applied. At each cylinder a pet cock 9 is inserted in the pipe with its outlet branch 10 opening into the explosion end of the cylinder. The fitting of the pet cock and the branch depends entirely upon the type of motor to which the device is applied. The pet cocks are each provided with laterally extending arms 11 for operating their closures. These arms are pivotally secured to a main operating bar 12 whereby they may be simultaneously opened to any extent desired. On an automobile the dash board 13 is used to afford support for the tank 4 and a guide for the rod 12 that projects through an aperture in the dash and is provided with a handle 14. The valves 3 and 7 are likewise arranged to have their operating handles 15 and 16 on the operator's side of the dash board and the gage for the tank 4 is likewise mounted so as to be in full view of the driver.

In operation opening of the lower valve admits gas to the desired pressure in the auxiliary tank. This valve is then closed and the upper valve opened sufficiently to fill the distributing pipe. Manipulation of the valve operating bar thereafter admits gas to the cylinders as desired. One object of the device is the arrangement of the auxiliary tank whereby the amount of gas supplied to the motor may be measured. Another advantage is the disposition of the shut-off between the two tanks whereby back firing into the main storage tank is prevented. The device is simple, easily disposed on any motor and is efficient.

I claim:

1. A starter for explosive engines comprising the combination with the cylinders of a motor, a main tank, an auxiliary tank in communication therewith, a valve controlling communication between the tanks, a distributing pipe leading from the auxiliary tank, a pet cock opening into each cylinder from the distributing pipe, a valve controlling the flow from the auxiliary tank into the distributing pipe, a gage indicating the pressure in the auxiliary tank, and manually operable means for simultaneously opening the cylinder pet cocks.

2. A starter for explosive engines comprising the combination with the cylinders of a motor, a main tank, an auxiliary tank in communication therewith, a valve controlling communication between the tanks, a distributing pipe leading from the auxiliary tank, a pet cock opening into each cylinder from the distributing pipe, a valve controlling the flow from the auxiliary tank into the distributing pipe, a gage indicating the pressure in the auxiliary tank, and a longitudinally reciprocable bar for simultaneously opening the cylinder pet cocks.

3. The combination with the cylinders of an explosive engine, of a main tank and auxiliary tank, a pipe leading from the main tank to the auxiliary tank, a manually operable valve controlling the flow through this pipe, a gage on the auxiliary tank for indicating the pressure therein, a distributing pipe leading from the auxiliary tank, a manually operable valve for controlling the flow through this pipe, pet cocks in communication with the distributing pipe, each discharging into one of the cylinders, operating arms for the pet cocks and a longitudinally reciprocable member articulated to the operating arm for simultaneously operating the pet cocks.

In testimony whereof I affix my signature in presence of two witnesses.

JUDSON E. GALTRA.

Witnesses:
JOSIE C. GALTRA,
KAY X. GALTRA.

Copies of this patent may be obtained for five cents each, by addressing the "Commissioner of Patents, Washington, D. C."

Affidavit having been filed in Letters Patent No. 1,045,966, granted December 3, 1912, for an improvement in "Starters for Explosive-Engines," showing that the name of the patentee should have been written and printed *Judson E. Goltra* instead of "Judson E. Galtra," it is hereby certified that the proper corrections have been made in the files and records pertaining to the case in the Patent Office and should be read in the said Letters Patent that the same may conform thereto.

Signed and sealed this 26th day of August, A. D., 1913.

[SEAL.]
THOMAS EWING,
*Commissioner of Patents.*